United States Patent [19]

Bonbon et al.

[11] Patent Number: 5,033,839
[45] Date of Patent: Jul. 23, 1991

[54] METHOD OF MINIMIZING THE MAXIMUM THICKNESS OF A UNIFOCAL OPHTHALMIC LENS AND GRADIENT INDEX UNIFOCAL OPHTHALMIC LENS OBTAINED BY APPLICATION OF THIS METHOD

[76] Inventors: Emmanuel Bonbon, 10 rue Foundary, 75015 Paris; Jean-Louis Mercier, 3 rue du Bon Puits, 91640 Fontenay Les Briis, both of France

[21] Appl. No.: 344,076

[22] Filed: Apr. 25, 1989
(Under 37 CFR 1.47)

[30] Foreign Application Priority Data

Apr. 25, 1988 [FR] France ................... 88 05435

[51] Int. Cl.$^5$ ................................. G02C 7/02
[52] U.S. Cl. ............................ 351/177; 350/413; 351/159
[58] Field of Search .............. 350/413; 351/159, 177

[56] References Cited

U.S. PATENT DOCUMENTS 3,816,160 6/1974 Moore ..................... 350/413
4,561,736 12/1985 Fürter ..................... 351/159

FOREIGN PATENT DOCUMENTS 0101972 11/1984 European Pat. Off. .
2707601 10/1977 Fed. Rep. of Germany .
2599157 11/1987 France .
2034498 6/1980 United Kingdom .
1571930 7/1980 United Kingdom .
2191017 12/1987 United Kingdom .

Primary Examiner—Scott J. Sugarman
Attorney, Agent, or Firm—Charles A. Brown

[57] ABSTRACT

A unifocal ophthalmic lens has part-spherical concave and convex surfaces. Its refractive index varies radially from its optical axis to its periphery. The variation of the refractive index is governed by a law such that the absolute value of the optical power of the lens is significantly greater than its geometrical power when the optical power is computed using the refractive index of the lens on its optical axis.

14 Claims, 2 Drawing Sheets

METHOD OF MINIMIZING THE MAXIMUM THICKNESS OF A UNIFOCAL OPHTHALMIC LENS AND GRADIENT INDEX UNIFOCAL OPHTHALMIC LENS OBTAINED BY APPLICATION OF THIS METHOD

BACKGROUND OF THE INVENTION

1. Field of the Invention

The present invention is generally concerned with unifocal ophthalmic lenses, that is to say constant power lenses, whether they are convergent (positive power) lenses or divergent (negative power) lenses.

It is more particularly directed to lenses in which the convex front surface and the concave rear surface are both part-spherical.

2. Description of the prior art

These lenses have the advantage of being relatively easy to machine.

They give rise to two problems, however.

The first relates to the fact that for relatively high powers their maximum or critical thickness, which is the thickness at the center for a positive power or the thickness at the periphery for a negative power, is relatively high, which is detrimental from the esthetic point of view and, given their resulting weight, from the user comfort point of view.

The second problem relates to the fact that, especially for higher powers, abberations and in particular astigmatism and field curvature abberations become increasingly important as the user's axis of vision moves away from the optical axis of the lens.

To minimize such abberations an aspherical surface is usually employed for at least one surface of the lens, at the cost of complicated machining thereof.

Also, the refractive index of the material contituting ophthalmic lenses is usually uniform.

In the case of ophthalmic lenses with part-spherical concave and convex surfaces the power is then geometrically determined by the refractive index, the radius of curvature of the surfaces and the thickness at the center.

However, it has already been proposed to vary the refractive index of an ophthalmic lens radially from its optical axis to its periphery.

This is the case, for example, in British Patent No 1 571 930 and also in published French patent application No 2 599 157.

In both cases this is essentially to correct abberations.

In more precise terms, in British patent No 1 571 930, in which the refractive index varies in a quasi linear manner, the preferential arrangement is such that, given this variation in the refractive index, the concave and convex surfaces of the lens concerned are still effectively part-spherical.

In published French patent application No 2 599 157, in which the concave and convex surfaces are necessarily part-spherical, it is in principle a question of minimizing the critical thickness of the lens.

However, the examples described in this document show that the refractive index does not necessarily vary in any significant manner in the central part of the lens, which is the most used part, and most importantly that the optical power of the lens does not differ in any significant way from its geometrical power.

The present invention is based on the fact, not previously demonstrated, that by appropriately varying the refractive index it is possible to modify significantly the optical power of a lens relative to its geometrical power, while achieving satisfactory correction of astigmatism and field curvature.

It is directed to the manufacture of unifocal ophthalmic lenses which advantageously have accurately part-spherical concave and convex surfaces and are therefore easy to machine, which achieve sufficient correction of astigmatism and field curvature aberrations, and which advantageously have a reduced maximum thickness.

SUMMARY OF THE INVENTION

In one aspect, the present invention consists in a method of minimizing the maximum thickness of a unifocal ophthalmic lens with part-spherical convex and concave surfaces and a refractive index that varies radially from the optical axis of the lens to its periphery, in which method the variation of the refractive index is governed by a law such that the absolute value of the optical power of the lens is significantly greater than its geometrical power when the optical power is computed using the refractive index of the lens on its optical axis.

In practise, in accordance with the invention, the absolute value of this optical power is at least 1.5 times the geometrical power.

The result of this is the required minimizing of the maximum thickness, to the benefit of esthetic appearance and weight.

For a given optical power it is then possible in accordance with the invention to implement unifocal ophthalmic lenses with spherical concave and convex surfaces with the maximum thickness reduced as compared with that of a conventional ophthalmic lens of the same type and the same power, although the astigmatism and field curvature aberrations are sufficiently corrected to be acceptable.

In another aspect, the present invention consists in a unifocal ophthalmic lens having part-spherical concave and convex surfaces and a refractive index that varies radially from the optical axis of the lens to its periphery, in which lens the variation of the refractive index is governed by a law such that the absolute value of the optical power of the lens is significantly greater than its geometrical power when the optical power is computed using the refractive index of the lens on its optical axis.

In essence, the present invention makes it possible to combine advantageously the use of part-spherical concave and convex surfaces, a reduced maximum thickness and good image quality.

The characteristics and advantages of the invention will emerge from the following description to be given by way of example only with reference to the appended diagrammatic drawings.

DESCRIPTION OF THE PREFERRED EMBODIMENTS

Figure 1:
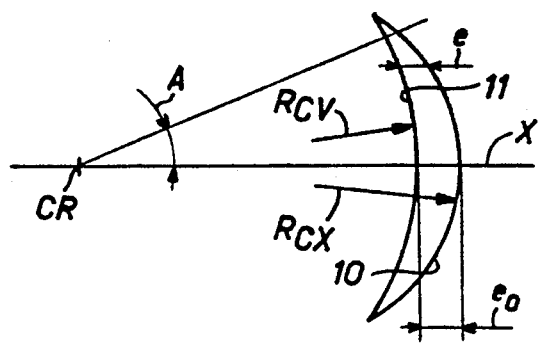
FIG. 1 is an unhatched view in cross-section through a unifocal ophthalmic lens in accordance with the invention.
Figure 2:
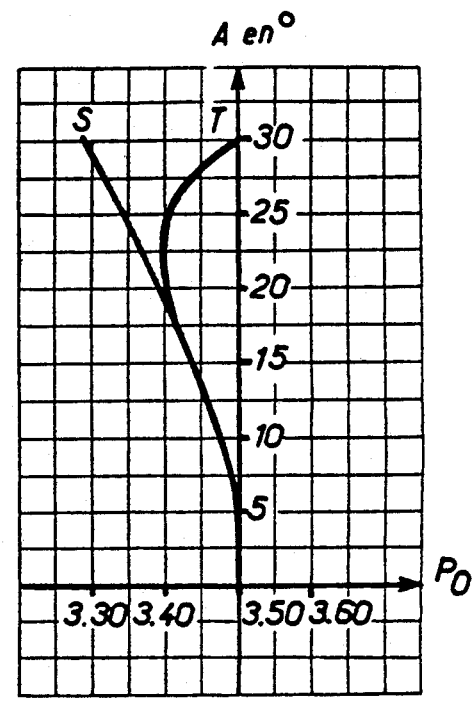
FIG. 2 is a diagram relating to the astigmatism and field curvature aberrations of this lens.
Figure 3:
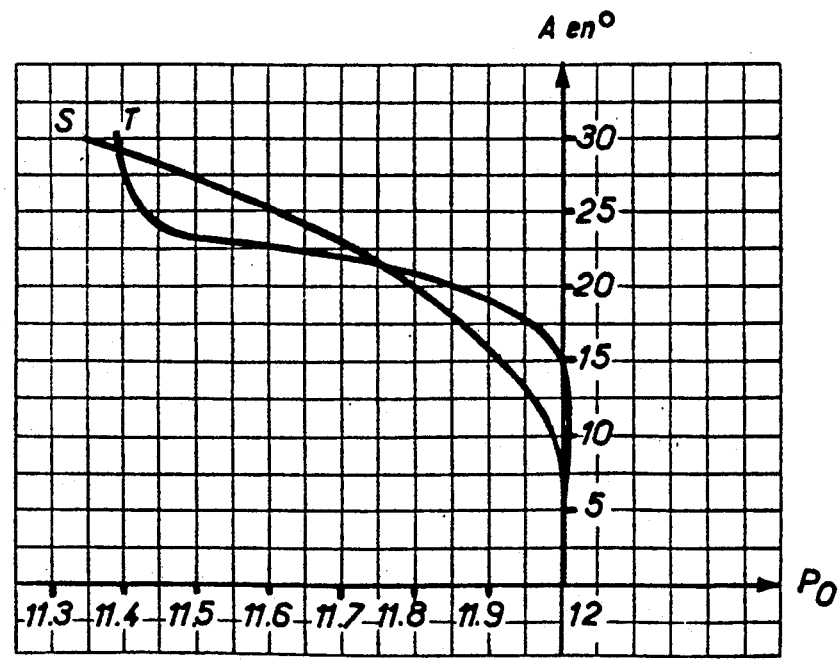
FIG. 3 is a diagram analogous to that of FIG. 2 for a lens of the same type as the previous lens but with other characteristics.

FIGS. 1 through 3 show the application of the invention to a convergent (positive power) ophthalmic lens.

It has a convex front surface 10 and concave rear surface 11.

Both are part-spherical.

$R_{CX}$ denotes the radius of the convex surface 10 and $R_{CV}$ denotes that of the concave surface 11.

$e_0$ denotes the thickness at the center as measured along the optical axis X of the lens.

If the refractive index of the material from which the lens concerned is made is uniform and has the value $n_0$ then the power of the lens is exclusively determined by its geometry, depending on, in addition to the refractive index $n_0$, the radii $R_{CX}$ and $R_{CV}$ of its convex and concave surfaces and on its thickness at the center $e_0$.

Let $P_G$ denote this power, referred to hereinafter as the geometrical power, which in practise is determined by the following equation:

$$P_G = D_1 + D_2 - \frac{e_0}{n_0} \cdot D_1 \cdot D_2$$

in which
$D_1 = (n_0 - 1)/R_{CX}$ and $D_2 = (n_0 - 1)/R_{CV}$.

In the case of a convergent unifocal ophthalmic lens the thickness at the centre $e_0$ is the maximum or critical thickness.

To minimize this maximum thickness it has been proposed, other conditions being equal, notably the power, to use a refractive index n that varies radially from the optical axis X of the lens towards its periphery.

Because the refractive index n varies as a function of the distance r to the optical axis X, in practise in the same sense as the thickness e of the lens as measured parallel to the optical axis X, the actual power of the lens, referred to hereinafter as its optical power $P_O$, differs slightly from its geometrical power $P_G$, because the refractive index n is involved in its computation.

In accordance with the invention, the law governing the variation of the refractive index n is chosen so that the absolute value of the optical power $P_O$ of the lens is significantly greater than its geometrical power $P_G$, the optical power $P_O$ being computed using the refractive index $n_0$ of the lens on its optical axis X.

The variation law is preferably chosen so that the absolute value of the optical power $P_O$ is at least 1.5 times the geometrical power $P_G$.

Thus in accordance with the invention the variation in the refractive index is used to "create" the optical power.

In practise the law governing the variation of its refractive index n is chosen so that at each point on the lens:

$$\frac{d[\text{grad } n]}{dr} \neq 0$$

in which, as previously explained, r is the distance from any point on the lens to the optical axis X.

This equation implies that at every point on the lens, including points in its central area, the variation in the refractive index n is not linear, but rather features a certain gradient.

Therefore in accordance with one characteristic of the invention it is by a gradient effect and not by a distribution effect that the variation of the refractive index is caused to "create" the optical power.

Of course, aberrations must be corrected, and in particular aberrations of astigmatism and field curvature.

However, in accordance with the invention the corresponding corrections are limited in that they are not pushed to the extreme but rather made just sufficient for the aberrations to remain within limits of tolerance usually regarded as sufficient, such as apply to conventional ophthalmic lenses of the same type.

Thus in accordance with the invention the variation in the refractive index n is chosen to favor increasing the absolute value of the power rather than to correct aberrations, to yield unifocal ophthalmic lenses which, while having part-spherical concave and convex surfaces, and which are therefore easy to machine, are advantageously lighter and of better esthetic appearance, because of the resulting increase in power, but which nevertheless have sufficient astigmatism and field curvature aberration correction for the latter aberrations to be no worse than what is usually regarded as acceptable.

In practise, it suffices in implementing the invention to determine the geometrical characteristics of the required lens, in this instance the radii $R_{CX}$ and $R_{CV}$ of its convex and concave surfaces and its thickness, for those skilled in the art to know how to choose the law governing the variation in the refractive index n which, while making it possible to obtain an optical power $P_O$ significantly greater than the geometrical power $P_G$, provides sufficient correction of astigmatism and field curvature aberrations.

The law governing the variation in the refractive index n may be expressed as follows, for example:

$$n = n_0 + \sum_{j=1 \text{ to } 5} a_j r^{2j}$$

$n_0$ being the refractive index on the optical axis X, $a_j$ being numerical coefficients and, as already mentioned hereinabove, r being the distance to the optical axis.

There will now be given by way of non-limiting example numerical values for two possible embodiments of a convergent unifocal ophthalmic lens.

EXAMPLE 1

$R_{CX} = 160$ mm
$R_{CV} = 237$ mm
$e_O = 3$ mm

For this geometry with a refractive index $n_O$ of 1.5 the geometrical power is:
$P_G = 1$ dpt In accordance with the invention the variation in the refractive index is such that the coefficients a of the corresponding law are as follows:

$a_1 = -4.0761 \times 10^{-4}$ $a_2 = -10^{-8}$ $a_3 = 0$ $a_4 = -5 \times 10^{-13}$ $a_5 = 6 \times 10^{-16}$ With this kind of variation of the refractive index the optical power $P_O$ obtained is:

$P_O = 3.5$ dpt.

It is therefore 3.5 times higher than the geometrical power $P_G$.

The refractive index n at a point situated at a radial distance of 15 mm from the optical axis X (this radial distance corresponds in practise to an angle of vision in the order of 30° relative to the optical axis) is:

$n_{15\ mm} = 1.417$

The difference $\Delta n$ between this refractive index n and the refractive index $n_O$ on the optical axis X is therefore 0.083.

It is therefore greater in absolute terms than 0.07.

The astigmatism and field curvature aberrations that the resulting convergent ophthalmic lens produces emerge from the FIG. 2 diagram.

In this diagram the horizontal axis shows the optical power $P_O$ in diopters and the vertical axis shows the angle of vision A relative to the optical axis X in degrees.

As is known, this angle of vision A is established relative to the center of rotation CR of the eye, with the ophthalmic lens assumed to be placed so that its concave rear surface 11 is at a distance of substantially 25 mm from the center of rotation CR.

In the FIG. 2 diagram the curve S corresponds to the sagittal focal length, which is that contained in the plane of FIG. 1, and the curve T corresponds to the tangential focal length, which is that contained in the plane perpendicular to the previous plane.

As is known, the difference $T - S$ corresponds to the astigmatism Ast and the expression $[(T+S)/2 - P_O]$ corresponds to the field curvature CC.

The FIG. 2 diagram, which has deliberately been limited to 30°, shows that this angle of vision corresponds normally to the maximum vertical scanning of the human eye, that the astigmatism Ast is less that 0.21 diopters, reaching this value at 30°, and that the field curvature CC, in absolute terms, remains below 0.14 diopters, reaching this value at 25°.

Thus:

$Ast_{max} = 0.21$ dpt at 30°, and $CC_{max} = -0.13$ dpt at 25°.

These values for astigmatism and field curvature aberrations are perfectly acceptable.

Also, as the field curvature is negative it can readily be compensated for by accommodation.

EXAMPLE 2

$R_{CX} = 100$ mm
$R_{CV} = 4815$ mm
$e_O = 7$ mm
whence $P_G = 5$ dpt for $n_O = 1.5$ $a_1 = -4.83 \times 10^{-4}$ $a_2 = -2.3 \times 10^{-7}$ $a_3 = 2 \times 10^{-10}$ $a_4 = -5 \times 10^{-3}$ $a_5 = -5 \times 10^{-16}$ $n_O = 1.5$ whence
$P_O = 12$ dpt $n_{15\ mm} = 1.39$
$\Delta n = -0.11$
$Ast_{max} = -0.17$ at 25°
$CC_{max} = -0.63$ at 30°

It will be noted that although the corresponding convergent ophthalmic lens is of high power the correction is sufficient.

The S and T curves for example 2 are shown in FIG. 3.

Figure 4:
FIGS. 4, 5 and 6 are respectively analogous to FIGS. 1, 2 and 3 for other unifocal ophthalmic lenses in accordance with the invention.
{{MD_END}}
Figure 5:
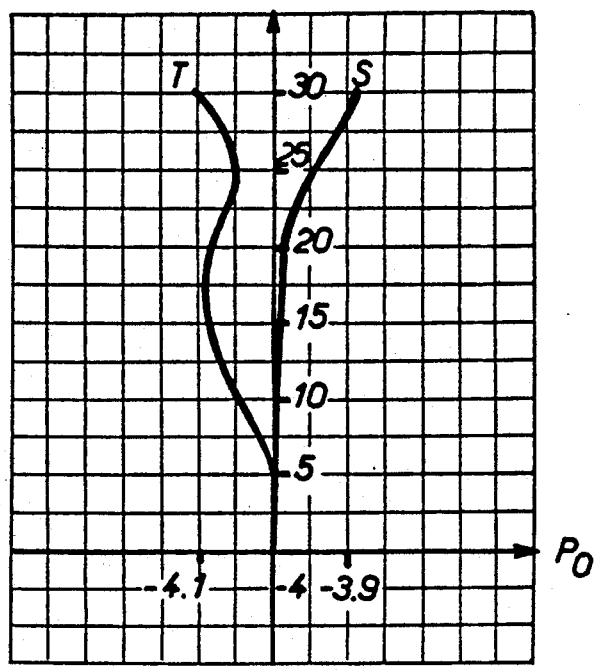
Figure 6:
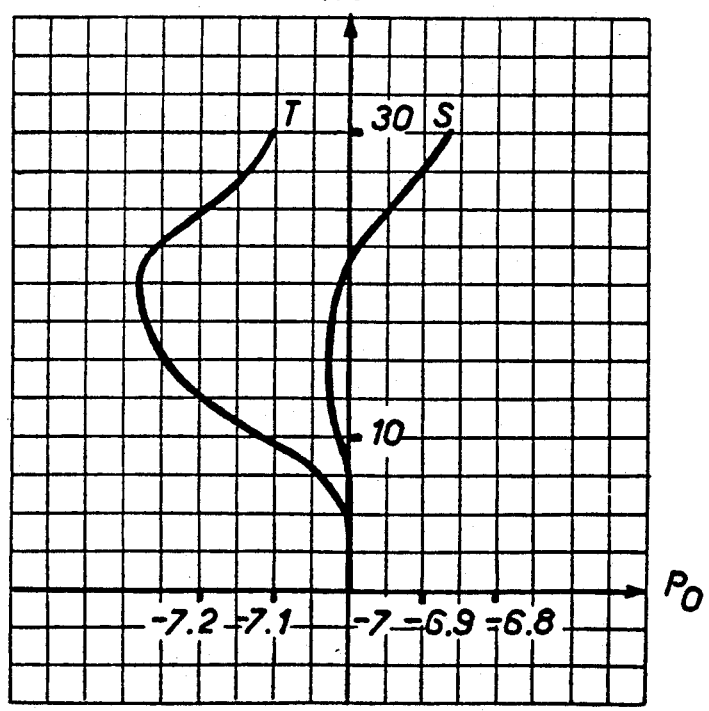

FIGS. 4 through 6 show the application of the invention to the implementation of a divergent (negative power) unifocal ophthalmic lens.

Two practical embodiments of same will be described hereinafter, given the same conditions as apply hereinabove.

EXAMPLE 3

$R_{CX} = 160$ mm
$R_{CV} = 100$ mm
$e_O = 2$ mm
whence $P_G = -2$ dpt for $n_O = 1.5$ $a_1 = 5.33 \times 10^{-4}$ $a_2 = -4.5 \times 10^{-7}$ $a_3 = 0$ $a_4 = 5 \times 10^{-3}$ $a_5 = 10^{16}$ $n_O = 1.5$ whence
$P_O = -4$ dpt $n_{15}$ mm $= 1.586$
$n = +0.086$
$Ast_{max} = -0.23$ dpt at 30°
$CC_{max} = -0.03$ dpt at 15°

FIG. 5 shows the S and T curves for example 3.

EXAMPLE 4

$R_{CX} = 200$ mm
$R_{CV} = 77$ mm
$e_O = 3$ mm
whence $P_G = -4$ dpt for $n_O = 1.5$ $a_1 = 5.017 \times 10^{-4}$ $a_2 = -5 \times 10^{-7}$ $a_3 = 0$ $a_4 = 5 \times 10^{-13}$ $a_5 = 1.5 \times 10^{-16}$ $n_O = 1.5$ whence
$P_O = -7$ dpt $n_{15\ mm} = 1.577$ n = +0.077
Ast$_{max}$ = −0.25 dpt at 20°
CC$_{max}$ = −0.15 dpt at 20°
FIG. 6 shows the S and T curves for example 4.

As previously, the aberrations are going in the right direction and remain within acceptable limits.

The table on the next page summarises the main parameters for the previous example and adds thereto additional parameters for further examples 5 through 10.

Note that the difference n between the refractive index on the optical axis and at a point at a radial distance of 15 mm therefrom is always greater

| | P$_O$ (diopters) | P$_G$ (diopters) | Δn (n$_{15mm}$ − n) | Ast$_{max}$ (diopters) | CC$_{max}$ (diopters) |
|---|---|---|---|---|---|
| EXAMPLE 1 | 3.5 | 1 | −0.083 | 0.21 | −0.13 |
| EXAMPLE 2 | 12 | 5 | −0.11 | −0.17 | −0.63 |
| EXAMPLE 3 | −4 | −2 | 0.092 | −0.23 | −0.03 |
| EXAMPLE 4 | −7 | −4 | 0.083 | −0.25 | −0.15 |
| EXAMPLE 5 | 10 | 3.5 | −0.119 | −0.15 | −0.51 |
| EXAMPLE 6 | 7 | 2 | −0.10 | 0.09 | −0.37 |
| EXAMPLE 7 | 4.5 | 1.5 | −0.07 | 0.27 | −0.12 |
| EXAMPLE 8 | −3 | −1 | 0.088 | −0.14 | −0.03 |
| EXAMPLE 9 | −6 | −3 | 0.094 | −0.28 | −0.14 |
| EXAMPLE 10 | −10 | −5 | 0.079 | −0.29 | −0.13 | than 0.07, in absolute value, being usually in the order of 0.1.

Note also that the ratio of the optical power P$_O$ to the geometrical power P$_G$ is as much as 3.5 in examples 1 and 6.

The usual techniques in this art are employed for the practical implemental of the index variation law adopted.

These techniques do not form any part of the present invention and will not be described here.

Applied to a bar, for example, they produce cylindrical iso-index surfaces and the bar treated in this way is then cut into blanks for machining into ophthalmic lenses.

Of course, the invention is not limited to the examples given but encompasses any variant execution thereof.

Also, although it has been assumed in the foregoing description, in order to simplify the latter, that a unifocal lens in accordance with the invention formed an entity in itself, it goes without saying that the invention can be applied equally well to multifocal lenses, for example to bifocal lenses, and could contribute to the formation of a multifocal lens of this kind, itself forming only part thereof.

There is claimed:

1. A method of minimizing the maximum thickness of a unifocal ophthalmic lens with part-spherical convex and concave surfaces and a refractive index that varies radially from the optical axis of the lens to its periphery comprising varying the refractive index in accordance with the equation $$\frac{d[\text{grad } n]}{dr} \neq 0$$

in which r is the distance from any point on the lens to the optical axis and such that the absolute value of the optical power of the lens is significantly greater than its geometrical power when the optical power is computed using the refractive index of the lens on its optical axis and in accordance with the equation $$n = n_0 + \sum_{j=1 \text{ to } 5} a_j r^{2j}$$

in which n$_0$ is the refractive index on the optical axis, a$_j$ are numerical coefficients and r is the distance of any point on the lens from the optical axis.

2. A method according to claim 1 wherein the absolute value of the optical power of the lens is at least 1.5 times its geometrical power.

3. A method of minimizing the maximum thickness of a unifocal ophthalmic lens with part-spherical convex and concave surfaces and a refractive index that varies radially from the optical axis of the lens to its periphery comprising varying the refractive index such that the absolute value of the optical power of the lens is significantly greater than its geometrical power when the optical power is compound using the refractive index of the lens on its optical axis, and in accordance with the equation $$n = n_0 + \sum_{j=1 \text{ to } 5} a_j r^{2j}$$

in which n$_0$ is the refractive index on the optical axis, a$_j$ are numerical coefficients and r is the distance of any point on the lens from the optical axis.

4. A method according to claim 3 wherein the absolute value of the optical power of the lens is at least 1.5 times its geometrical power.

5. A unifocal ophthalmic lens having part-spherical concave and convex surfaces and a refractive index that varies radially from the optical axis of the lens to its periphery, in which lens the variation of the refractive index is governed by a law such that the absolute value of the optical power of the lens is significantly greater than its geometrical power when the optical power is computer using the refractive index of the lens on its optical axis, said law being defined by the equation $$\frac{d[\text{grad } n]}{dr} \neq 0$$

in which r is the distance from any point on the lens to the optical axis, and said law also being defined by the equation $$n = n_0 + \sum_{j=1 \text{ to } 5} a_j r^{2j}$$

in which n$_0$ is the refractive index on the optical axis, a$_j$ are numerical coefficients and r is the distance of any point on the lens from the optical axis.

6. A unifocal ophthalmic lens according to claim 5 wherein the absolute value of the optical power to the lens is at least 1.5 times its geometrical power.

7. A unifocal ophthalmic lens according to claim 6 wherein the ratio of the optical power of the lens to its geometrical power is 3.5.

8. A unifocal ophthalmic lens according to claim 5 wherein the absolute value of the difference between the refractive index on the optical axis and that at any point a radial distance of 15 mm from the optical axis is greater that 0.07.

9. A unifocal ophthalmic lens according to claim 5 wherein the absolute value of the difference between the refractive index on the optical axis and that at any point a radial distance of 15 mm from the optical axis is on the order of 0.1.

10. A unifocal ophthalmic lens having part-spherical concave and convex surfaces and a refractive index that varies radially from the optical axis of the lens to its periphery, in which lens the variation of the reference index is governed by a law such that the absolute value of the optical power of the lens is significantly greater than its geometrical power than the optical power is computed using the refractive index of the lens on its optical axis, said law being defined by the equation $$n = n_0 + \sum_{j=1 \text{ to } 5} a_j r^{2j}$$

in which $n_0$ is the refractive index on the optical axis, $a_j$ are numerical coefficients and r is the distance of any point on the lens from the optical axis.

11. A unifocal ophthalmic lens according to claim 10 wherein the absolute value of the optical power of the lens is at least 1.5 times its geometrical power.

12. A unifocal ophthalmic lens according to claim 11 wherein the ratio of the optical power of the lens to its geometrical power is 3.5

13. A unifocal ophthalmic lens according to claim 10 wherein the absolute value of the difference between the refractive index on the optical axis and that at any point a radial distance of 15 mm from the optical axis is greater than 0.7.

14. A unifocal ophthalmic lens according to claim 10 wherein the absolute value of the difference between the refractive index on the optical axis and that at any point a radial distance of 15 mm from the optical axis is on the order of 0.1.

* * * * *